June 20, 1967 U. FRANK 3,326,230
VALVE DISCRIMINATING MEANS
Filed Oct. 18, 1965
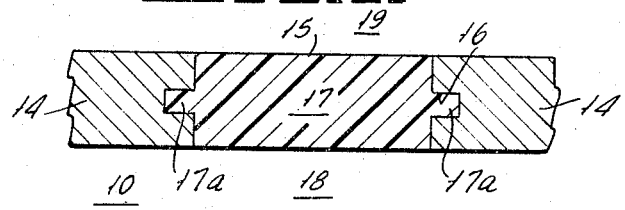
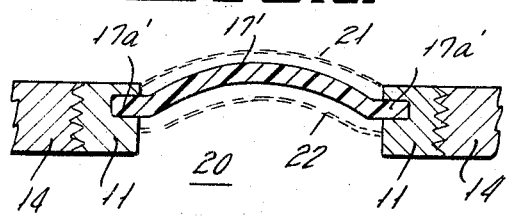
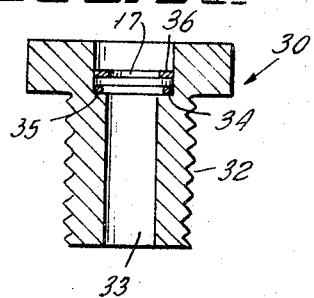
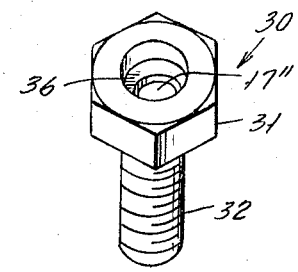
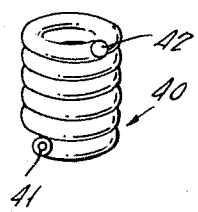
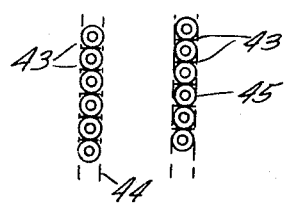
INVENTOR.
ULRICH FRANK
BY
OSTROLENK, FABER, GERB & SOFFEN
ATTORNEYS

United States Patent Office 3,326,230
Patented June 20, 1967

3,326,230
VALVE DISCRIMINATING MEANS
Ulrich Frank, Yardley, Pa., assignor to Radio Corporation of America, a corporation of Delaware
Filed Oct. 18, 1965, Ser. No. 502,760
1 Claim. (Cl. 137—199)

This invention relates to valve means and more particularly to a novel discriminating valve means for use in a variety of applications wherein it is desirable to admit air through the valve while at the same time preventing water or any other liquid from passing through said valve and is a continuation-in-part of my copending application Ser. No. 288,781, filed June 18, 1963, entitled Valve Discriminating Means, now abandoned.

There exist a variety of applications and devices wherein it is desired to house a device so as to prevent the introduction of any liquids into the housing which may act to contaminate the device so housed. In addition thereto, it may simultaneously be necessary to enable the device so housed to "breathe." It is possible, for example, that during the operation of said device a certain amount of heat may be radiated by such a device. This creates a differential pressure between the air contained within the housing relative to the air exterior to the housing. It is therefore necessary to provide a valve means to permit as rapid equalization of the pressure differential as possible in order to permit the escape of the hot air. Considering the reverse possibility, the pressure of the air exterior to the housing may be greater than the pressure of the air contained within the housing and it is equally as necessary to provide a rapid equalization operation for this condition as was the case for the first possible condition recited above.

This, therefore, necessitates the need for a valve means which, upon exposure to a pressure differential across its opposite sides, permits passage of air therethrough to equalize the pressure levels between the housing exterior and the housing interior.

Since such a housing may be installed out of doors or may even possibly be installed beneath the surface of a body of water for a certain period of time which may extend for either a short or a long interval, it becomes extremely necessary to provide a valve means which has the capability of "discriminating" as to which type of fluid it will pass or prevent the passage of. Thus, a valve means for use in such applications must simultaneously be capable of permitting the passage of air therethrough in order to provide for equalization of pressure differential and simultaneously to prevent the passage of water or other liquids therethrough due to the possible damage or contamination which such liquids may inflict upon the device being so used.

One very severe application for such devices is in housings of portable military electronic equipment which generates a large amount of heat during operation. The generated heat requires that the housing have proper ventilation. Such portable equipment is often dropped by parachute into the surface of a military beachhead. The dropped equipment may not be retrieved for many hours or possibly even days. Thus the ventilation means employed must be capable of preventing ingress of water of rather substantial pressures (relative to rainfall) to the interior of the housing.

The instant invention provides a novel valve discriminating means which is simple in design, extremely economical in its cost of materials and fabrication and which has no moving parts in performing the above operations so as to provide it with the capability of an extremely long useful operating life.

The device of the instant invention is comprised of a piece of porous material of relatively uniform porosity throughout. The porous material is substantially inert to chemicals, bacteria and a variety of other fluids and agents which may exhibit certain toxic or destructive properties. The porous material is mounted in a disc which may be suitably threaded to be received in a threaded aperture provided in a housing; or bolted, clamped or held with adhesives. Also, the periphery of the porous material itself may be threaded to threadedly engage the housing opening.

The porous material selected is taken from the group of plastic materials which have special hydrophobic qualities which react in such a way with liquids, such as water, for example, that the surface tension characteristics of the water coacting with the porous material prevents the passage of water therethrough. The hydrophobic qualities, however, have no such reaction whatsoever with air and thereby the porous material freely permits the passage of air therethrough while preventing any water from passing through the valve means. One typical porous material which exhibits the necessary characteristics is that of the porous sponge Teflon, the chemical name of which is polytetrafluoroethylene. Other suitable materials are vinyl chloride and vinylidene chloride plastics; nylon; polyester films such as mylar, for example; and fluorocarbon such as Kel-F. By controlling maximum pore size and average pore size of the porous material, as well as the percentage of voids present in the porous material, this very accurately controls the rate of air flow through the material as well as the water pressure which the porous material is capable of withstanding. As one typical example, a piece of porous polytetrafluoroethylene material having a maximum pore size of 10 microns, an average pore size of 5 microns and a void percentage of 25% has been found to withstand water pressure of over 3 p.s.i. for a period exceeding one week. The porous material of the above characteristics will permit the passage of air at a rate of 60 cu. in. per second of air at standard temperature and pressure through 24 square inches of filter surface, at a differential air pressure of 3 p.s.i. across said material, which is $\frac{1}{16}$ inch thick.

By increasing both the average and maximum pore sizes, this acts to decrease the water pressure that the porous material can withstand while at the same time increasing the rate of air flow through the filter means. Conversely, by decreasing the average and maximum pore sizes, this acts to increase the water pressure that the filter can withstand while decreasing the rate of flow of air therethrough.

It has been shown by experimentation that the advantageous qualities of the discriminating valve means retain their effectiveness by limiting the pore size to the range of nearly zero to 100 microns. The most effective range for void percentage has been found to lie between the limits of 25% to 50% voids. However, the outside range for void percentage may be regulated to lie within the broad range of nearly 0% to 75% voids.

While the porous material may be of any configuration, one preferred configuration is that of forming the porous material into a circular disc design which may then be readily inserted into a suitable threaded plug for threadedly engaging a mating threaded aperture provided in a housing. The porous disc material is suitably retained upon a ledge provided in the threaded plug and fixedly secured in this position by means of a snap ring. The surface area and diameter of porous valves of circular shape may vary over an extremely wide range. Typical diameters for such disc shaped filters may extend over the range of ⅜ inch to 12 inch diameters.

In many applications it may be desirable to mount the valve means along the upper horizontal surface of a housing. In cases where the housing is exposed to humid conditions or rainfall or possibly to immersion in a body of water, the effectiveness of the valve means may be severely impaired if water is permitted to collect upon the surface of the disc shaped valve member. This can occur by a drop in temperature causing the water collected upon the surface of the valve member to freeze, thereby completely destroying the effectiveness of the valve. This disadvantage is overcome by forming the disc shaped valve member substantially in a hemispheric fashion so that any water which impinges upon the surface of the valve member will run off and therefore fail to cover the valve member.

While a hemispheric and a disc shaped valve have been described herein, it should be noted that valves of other sizes, shapes and configurations may be employed depending upon the objects of the user. It may be desired to provide as much surface area for the valve as is possible while limiting the overall dimensions of the valve member. The valve member may then be formed to provide a corrugated profile so as to increase the total surface area thereof. Still another possible configuration for increasing total surface area is that of forming the porous material in a tubular fashion. The tubular porous material is then coiled and a first end is completely sealed. The opposite or open end may then be secured to the housing opening in any suitable fashion. This arrangement provides a discriminating valve means which has a substantially large surface area while at the same time occupying a limited amount of space relative to the total surface area provided.

While a variety of materials exhibit hydrophobic qualities only those materials in the fluorocarbon category have been found to yield effective results. Materials in this category are polytetrafluoroethylene, Kel-F, for example.

It is therefore one object of the instant invention to provide a novel discriminating valve means for permitting the passage of air therethrough while simultaneously preventing the passage of water therethrough wherein said valve means is comprised of a porous material.

Another object of the instant invention is to provide a novel discriminating valve means for permitting the passage of air therethrough while simultaneously preventing the passage of water therethrough wherein said valve means is comprised of a porous material which is mounted within a threaded plug suitable for threaded engagement in a tapped aperture of the housing.

Still another object of the instant invention is to provide a novel discriminating valve means for permitting the passage of air therethrough while simultaneously preventing the passage of water therethrough wherein said valve means is comprised of porous material having good hydrophobic characteristics.

A further object of the instant invention provides a novel discriminating valve means for permitting the passage of air therethrough while simultaneously preventing the passage of water therethrough wherein said valve means is comprised of porous polytetrafluoroethylene material having a porosity in the range of nearly zero to 100 microns.

A still further object of the instant invention provides a novel discriminating valve means for permitting the passage of air therethrough while simultaneously preventing the passage of water therethrough wherein said valve means is comprised of a porous sponge polytetrafluoroethylene [Teflon] material having voids in the range of 5% to 75%.

Another object of the instant invention provides a novel discriminating valve means for permitting the passage of air therethrough while simultaneously preventing the passage of water therethrough wherein said valve means is comprised of a porous material exhibiting hydrophobic non-wettable characteristics to prevent the passage of water therethrough.

Still another object of the instant invention provides a novel discriminating valve means for permitting the passage of air therethrough while simultaneously preventing the passage of water therethrough wherein said valve means is comprised of a substantially hemispheric shaped disc of porous material.

An additional object of the instant invention provides a novel discriminating valve means for permitting the passage of air therethrough while simultaneously preventing the passage of water therethrough wherein said valve means is comprised of a porous material having a corrugated profile.

Another object of the instant invention provides a novel discriminating valve means for permitting the passage of air therethrough while simultaneously preventing the passage of water therethrough wherein said valve means is comprised of a tubular porous material having a sealed first end and an open second end.

These and other objects of the instant invention will become apparent when reading the accompanying description and drawings in which:

FIGURE 1 shows a cross-sectional view of a discriminating valve means designed in accordance with the principles of the instant invention.

FIGURE 2 is a cross-sectional view of another preferred embodiment of the instant invention.

FIGURE 3 is a perspective view of still another embodimnet of the instant invention.

FIGURE 3a is a cross-sectional view of the embodiment of FIGURE 3.

FIGURE 4 shows still another preferred embodiment of the instant invention.

FIGURE 4a is a cross-sectional view taken along 4a—4a of the embodiment of FIGURE 4.

Referring now to the drawings, FIGURE 1 shows a discriminating valve means 10 comprised of plug member 17 shown in cross-sectional fashion which is held about its periphery with mastic, adhesive or similar substance in housing 14, only a portion of which is shown for purposes of clarity. The housing 14 is provided with opening 15 having a circular channel 16 for receiving the discriminating valve member 17. The valve member 17 is formed of a porous material exhibiting a hydrophobic quality and is provided with a projecting flange 17a about its periphery so as to be received by the channel 16 of housing 14. It should be assumed that the housing 14 is continuous along the remainder of its entire exterior surface (not shown) with the only opening provided being that through the porous material 17. Let it be assumed that the underside 18 of valve member 17 represents the region confined by the housing 14, while the upper side 19 of valve member 17 represents the region which is exterior to the housing 14. If a pressure differential exists on the opposite sides 18 and 19 of the porous valve member 17, this pressure differential will be equalized by the passage of air through valve member 17 of an amount sufficient to equalize the pressure levels on both sides of the valve member. It has been found that the air flow across the valve means is constant and proportional to the differential of pressure existing across the valve member. This air flow cannot be impeded with transformer oil or dirt which may be present on either surface of the valve member 17. Additional tests have shown that for a given thickness of porous material, a column of water of over four feet will not pass through the porous disc even though placed upon the disc for a period exceeding one week.

The valve member 17 depends for its successful operation of discriminating between air and water upon the hydrophobic qualities of the porous material which coacts with the surface tension of the water to prevent passage thereof. If this surface tension is destroyed by the addition of wetting agents, the valve member will readily pass the treated water.

The porous material employed may be porous sponge Teflon having a pore size in the range of 1–100 microns. The void percentage of the porous Teflon may lie anywhere within the range from 5% to 75% voids, with the most preferred range being 25% to 50% voids.

One method of producing such porous polytetrafluoroethylene consists of sintering the (Teflon) polytetrafluoroethylene material. By controlling the pressure, temperature, particle size and the amount of material employed in the sintering operation and the length of the sintering operation, the pore size and void percentage may be controlled within accurate limits. Another method of preparing the porous material consists of puncturing solid polytetrafluoroethylene sheets with an extremely narrow diameter pin in a substantially uniform manner so as to provide the desired porosity. The other hydrophobic materials previously discussed may also be prepared in the above manners.

In applications where the valve means is or may be exposed to substantial amounts of water or moisture, the embodiment 20 of FIGURE 2 may be employed. This embodiment is identical to that of FIGURE 1 (with like reference numerals denoting the like elements) with the exception that the valve means designated by the numeral 17' has a substantially hemispheric shape as shown and is housed in a disc shaped member 11 which threadedly engages housing 14 at 12 and 13. The embodiment 20 is further provided with first and second metallic screens 21 and 22 positioned respectively above and below the valve means 17', which screens are secured in place by disc shaped member 11. The screens provide adequate support for the valve member and a measure of protection such that sharp instruments and/or sharp blows inflicted upon the valve member will not impair its effectiveness. The plug 11 may be threaded as shown or bolted on housing 14.

With the embodiment of FIGURE 2, if moisture or water impinges upon the upper surface of valve member 17', the hemispheric shape will cause any droplets of water to "run off" the valve means so as to prevent a pool of water from completely covering the upper surface of the valve member. Thus, if the valve member is exposed to freezing temperatures, this condition will in no way impair the effectiveness of the valve means, due to the freezing of any water which may impinge and collect upon the surface of the valve.

FIGURES 3 and 3a show still another embodiment 30 of the instant invention, which is comprised of a bolt-shaped plug 31 having a threaded lower portion 32 and a central opening 33. The upper end of opening 33 is provided with a ledge 34 having an O-ring 35 positioned thereon. The valve member designated by the numeral 17" is positioned atop O-ring 35. A snap-ring 36 is positioned on top of valve member 17", and acts to position and secure the valve member upon ledge 34. The O-ring acts to prevent the passage of water or any other liquid "around" the valve member 17". While the total surface area of the embodiment 30 may be substantially small and the diameter of valve member 17" is of the order of ⅜ inch, it should be understood that the surface area and diameter (when circular valve members are employed) may vary over an extremely wide range with typical diameters in the range of ⅜ inch diameters to 12 inch diameters.

FIGURE 4 shows still another preferred embodiment 40 which is a tubular filter member coiled in the manner as shown, and having a closed or sealed end 42 and an open end 41 which is secured to a housing opening 46, of a housing 47 which is to be vented. The manner of securement may be those arrangements previously described or any other suitable arrangement desired. The embodiment 40 provides a discriminator valve means having a large amount of surface area relative to the space which the valve means 40 occupies. In order to further increase the surface area, suitable spacer members 43, shown in the cross-sectional view of FIGURE 4a, so as to minimize contact between the opposing surfaces of adjacent loops of the coiled valve means 40, are provided. In order to support the coiled valve means 40, a cylindrically-shaped screen 44 may be provided within the interior coiled valve means 40 as shown in FIGURE 4a. As another alternative, a second cylindrically-shaped screen 45 may be provided to surround the outer periphery of the coiled valve means 40. Either or both of the cylindrically-shaped screens 44 or 45 may be employed to provide adequate support. The screens 44 and 45 may be supported upon housing 47 in any suitable manner.

It can therefore be seen that the instant invention provides a novel discriminating valve having hydrophobic qualities which prevents the passage of water or other liquids through said valve while, at the same time, permitting the passage of air therethrough in the presence of a differential pressure across said valve. Such a valve has a variety of applications for use with equipment which may be confined within a housing wherein it is desirable to permit said equipment to "breathe" while, at the same time, preventing the introduction of water or other liquids into said housing. The valve means is capable of withstanding water pressure so as to permit use of the discriminating valve in housings which may be submerged in a body of water for indefinite periods. The valve means may be formed in a variety of configurations depending only upon the needs of the user.

Although in the foregoing specification there have been described preferred embodiments of this novel invention, many variations and modifications will now be apparent to those skilled in the art. Therefore, this invention is to be limited, not by the specific disclosure herein, but only by the appended claim.

What is claimed is:

Discriminating valve means comprising;
a porous member;
holding means for positioning and securing said porous member;
said holding means being a rigid substantially disc-shaped metallic member having a centrally located opening;
the outer periphery of said disc-shaped holding member being threaded for making threaded engagement with a tapped aperture;
said porous member being a porous plastic material; said plastic material being formed of open cell sponge polytetrafluoroethylene material exhibiting hydrophobic, non-wettable characteristics to prevent the passage of liquids therethrough while permitting the passage of air therethrough;
said porous plastic material having voids in the range of 25 to 50% voids, and having pore sizes in the range of 1 to 100 microns;
said porous member being disc-shaped; the thickness of said porous member being substantially less than the thickness of said holding member;
said disc-shaped porous member having a hemispheric shape;
said holding member opening having a circular shaped channel for receiving and securing the peripheral portion of said disc-shaped porous member;
first and second metallic screens each having a circular periphery and a hemispheric configuration substantially identical to said porous member;

said first and second screens each being secured along their periphery to the central aperture of said holding member on opposite sides of said porous member to protect said porous member from being damaged by sharp instruments or sharp blows;

a substantial portion of the hemispheric surface area of said porous member extending beyond one surface of said holding member to permit liquids falling upon said porous member to run off the hemispheric surface.

References Cited

UNITED STATES PATENTS

| | | | |
|---|---|---|---|
| 2,383,946 | 9/1945 | Tietig. | |
| 2,687,448 | 8/1954 | Gulick | 136—177 X |
| 2,835,720 | 5/1958 | Buskirk | 136—177 |
| 2,883,058 | 4/1959 | Jaume | 210—494 X |
| 3,033,911 | 5/1962 | Duddy | 137—197 X |
| 3,165,470 | 1/1965 | Giesse | 55—524 X |

ALAN COHAN, *Primary Examiner.*
WILLIAM F. O'DEA, *Examiner.*